(12) United States Patent
Cole

(10) Patent No.: US 6,422,334 B1
(45) Date of Patent: Jul. 23, 2002

(54) BALL SCREW RACK ASSEMBLY

(75) Inventor: Michael James Cole, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/662,931

(22) Filed: Sep. 15, 2000

Related U.S. Application Data

(60) Provisional application No. 60/154,682, filed on Sep. 17, 1999.

(51) Int. Cl.$^7$ ................................................ B62D 5/04
(52) U.S. Cl. ...................................... 180/444; 180/443
(58) Field of Search ............................... 180/443, 444; 74/422

(56) References Cited

U.S. PATENT DOCUMENTS

| | | | | |
|---|---|---|---|---|
| 5,685,390 A | * | 11/1997 | Chikuma et al. | 180/444 |
| 5,738,181 A | * | 4/1998 | Kato | 180/400 |
| 5,904,224 A | * | 5/1999 | Onodera et al. | 180/444 |
| 5,921,344 A | * | 7/1999 | Boyer | 180/444 |
| 5,988,311 A | * | 11/1999 | Kuribayashi et al. | 180/444 |
| 6,155,376 A | * | 12/2000 | Cheng | 180/444 |
| 6,186,268 B1 | * | 2/2001 | Onodera et al. | 180/444 |

OTHER PUBLICATIONS

"Series BG Ball Grove Shaft/Super Ball Bushing Bearing Installation Data" For more information see http://www.thomsonindustries.com/componts/ti090523.htm—Super Ball Bushing Bearings.

* cited by examiner

*Primary Examiner*—J. J. Swann
*Assistant Examiner*—L. Lum
(74) *Attorney, Agent, or Firm*—Edmund P. Anderson

(57) ABSTRACT

An automotive ball screw rack assembly for positioning a road wheel is presented. The assembly comprises an actuator housing; a ball screw disposed within the actuator housing; at least one tie rod assembly connected to the ball screw and the road wheel; and a motor coupled to the ball screw and connected to the actuator housing for controlling the disposition of the ball screw within the actuator housing.

8 Claims, 2 Drawing Sheets

BALL SCREW RACK ASSEMBLY

CROSS-REFERENCE TO RELATED APPLICATIONS

This application is based upon, and claims the benefit of, United States Provisional Patent Application No. 60/154,682, filed Sep. 17, 1999, the disclosures of which are incorporated by reference herein in their entirety.

TECHNICAL FIELD

This disclosure relates to an automotive ball screw rack assembly for positioning a road wheel in an automotive steering system.

BACKGROUND OF THE INVENTION

It is known to provide ball bushing bearings that make it possible to obtain friction free linear motion of a shaft along with resistance to torque, torque drive and rotary positioning. An anti-friction rolling key may be formed by the balls of the ball bushing bearings running in a groove of the shaft and a groove of the ball bushing bearing plate which is adjusted radially. For torque resistance, one or more shafts and a plurality of ball bushing bearings may support a carriage subject to an offset load. Torque drive of housings, mounted on the ball bushing bearings and shaft, is permitted by simple rotation of the shaft or by simple rotation of the housings. For rotary positioning, the combination of ball bushing bearings mounted on the shaft enables rotary positioning for linear motion. Partial revolution of the shaft rotates the housing or partial revolution of the housing rotates the shaft.

SUMMARY OF THE INVENTION

An automotive ball screw rack assembly for positioning a road wheel is presented. The assembly comprises an actuator housing; a ball screw disposed within the actuator housing; at least one tie rod assembly connected to the ball screw and the road wheel; and a motor coupled to the ball screw and connected to the actuator housing for controlling the disposition of the ball screw within the actuator housing.

DESCRIPTION OF THE DRAWINGS

The present invention will now be described, by way of example, with reference to the accompanying drawings, in which.

DESCRIPTION OF THE PREFERRED EMBODIMENT

Figure 1:
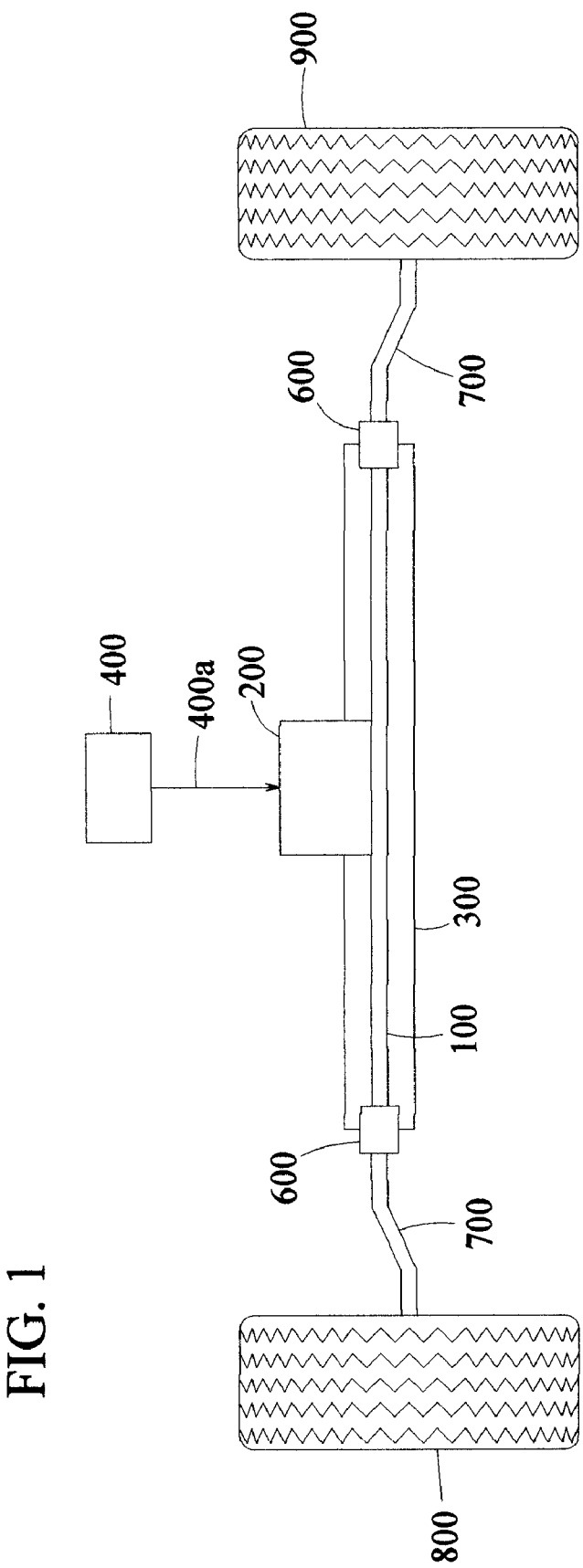
FIG. 1 is a schematic representation of a ball screw rack assembly.
Figure 2:
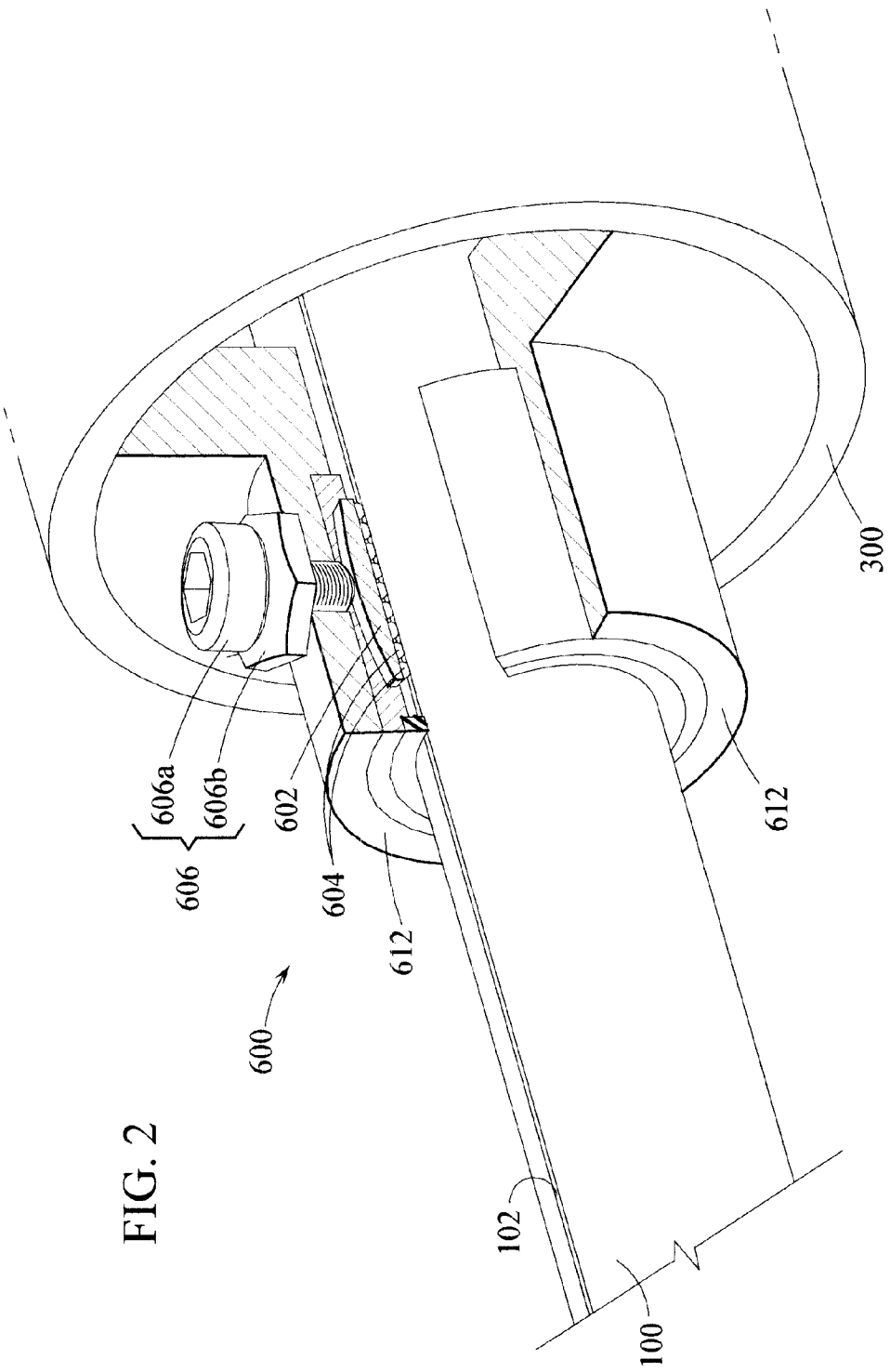
FIG. 2 is a representation of a rolling key system.

A description of the preferred embodiment will now be had, with reference to FIGS. 1 and 2. FIG. 1 is a schematic representation of the ball screw rack assembly of the present invention. Therein depicted is a ball screw rack 100 disposed within a housing 300. At least one steering assembly 700 is connected to the ball screw rack 100 and to at least one road wheel 800, 900. It will be appreciated that the steering assembly 700 typically comprises crank arms, tie rods and steering arms(not shown in the interest of clarity) for rotating the road wheels 800, 900 in response to the motion of the ball screw rack 100 within the housing 300. A motor 200 is coupled to the ball screw rack 100 and connected to the housing 300. The motor is operative in directing the motion of the ball screw rack 100 within the housing 300. A controller 400 is in signal communication 400a with the motor 200 for controlling the motor in directing the motion of the ball screw rack 100. The ball screw rack 100 includes a groove 102 contiguous to the surface of the ball screw rack 100 and parallel to the axis thereof. At least one rolling key system 600 is coupled to the groove 102 and connected to the housing 300 for allowing the axial motion of the ball screw rack 100 within the housing 300 while countering torque on the ball screw rack 100 developed during the steering motion of the steering system 700.

Reference will now be made to FIG. 2. Therein depicted is a representation of the at least one rolling key system 600 of the present invention. The rolling key system 600 comprises at least one ball 604 disposed along the groove 102 and a bearing plate 602 encapsulating the ball 604. The rolling key system 600 also includes a end cap sleeve 612 disposed about the ball screw rack 100 encompassing thereby the bearing plate 602. A clamping device 606 is connected to the bearing plate 602 and the end cap sleeve 612 for adjusting the load on the bearing plate 602 and aiding in retaining the ball 604 along the groove 102 during the motion of the ball screw rack 100 within the housing 300. The clamping device 606 comprises a screw 606a and a lock nut 606b coupled thereto. The screw 606a adjusts the load in the bearing plate 602 and the lock nut 606b prevents the screw from loosening. Based upon the foregoing description of the present invention, it will be appreciated that the rolling key system 600 is operative to allow the axial motion of the ball screw rack 100 within the housing 300 while countering torque applied to the ball screw rack 100 during the steering motion of the steering assembly 700.

Adjusting a preloaded setting in the ball screw rack assembly may be accomplished by inserting the rack into the housing; aligning the groove with the ball directly under the bearing plate; aligning the bearing plate under the clamping assembly; preloading the bearing plate with the screw; and locking the screw to a preload setting with the locknut.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed are not to be construed as limiting the claims.

What is claimed is:

1. An automotive ball screw rack assembly for positioning at least one road wheel, the assembly comprising:
    a housing;
    a ball screw rack disposed within the housing;
    at least one steering assembly connected to the ball screw rack and to the at least one road wheel;
    a motor coupled to the ball screw rack and connected to the housing for directing a motion of the ball screw rack within the housing; and
    an antirotation mechanism coupled to the ball screw rack and connected to the housing for preventing a rotation of the ball screw rack.

2. The automotive ball screw rack assembly as set forth in claim 1 wherein the ball screw rack includes a groove contiguous to the surface of the ball screw rack and parallel to the axis thereof.

3. The automotive ball screw rack assembly as set forth in claim 2 wherein the antirotation mechanism comprises:
    at least one rolling key system coupled to the groove and connected to the housing for preventing the rotation of the ball screw rack within the housing.

4. The automotive ball screw rack assembly as set forth in claim 3 wherein the rolling key system includes:
- at least one ball disposed along the groove;
- a bearing plate encapsulating the at least one ball disposed along the groove;
- an end cap sleeve connected to the housing and disposed about the rack encompassing thereby the bearing plate; and
- a clamping device connected to the bearing plate and the end cap sleeve for adjusting a load on the bearing plate.

5. The automotive ball screw rack assembly as set forth in claim 4 wherein the clamping device comprises a
- a screw; and
- a locknut coupled to the screw for locking the screw in place.

6. The automotive ball screw rack assembly as set forth in claim 5 wherein the end cap sleeve comprises a plurality of sleeves.

7. The automotive ball screw rack assembly as set forth in claim 1 further comprising a controller in signal communication with the motor for controlling the motor in directing the motion of the ball screw rack within the housing.

8. A method of adjusting an automotive ball screw rack assembly for positioning at least one road wheel, the ball screw rack assembly having a housing; a ball screw rack disposed within the housing, including a groove contiguous to a surface of the ball screw rack and parallel to an axis thereof; at least one ball disposed along the groove; a bearing plate encapsulating the at least one ball; an end cap sleeve disposed about the rack encompassing thereby the bearing plate; a clamping assembly including a screw and a locknut coupled to the screw for locking the screw in place; at least one steering assembly connected to the ball screw rack and the at least one road wheel; and a motor coupled to the ball screw rack and connected to the housing for directing a motion of the ball screw rack within the housing, the method comprising:
- inserting the rack into the housing;
- aligning the groove with the at least one ball directly under the bearing plate;
- aligning the bearing plate under the clamping assembly;
- preloading the bearing plate with the screw; and
- locking the screw to a preload setting with the locknut.

* * * * *